United States Patent
El-Siblani et al.

(10) Patent No.: US 8,394,313 B2
(45) Date of Patent: Mar. 12, 2013

(54) PROCESS FOR THE PRODUCTION OF A THREE-DIMENSIONAL OBJECT WITH AN IMPROVED SEPARATION OF HARDENED MATERIAL LAYERS FROM A CONSTRUCTION PLANE

(75) Inventors: Ali El-Siblani, Dearborn Heights, MI (US); Alexandr Shkolnik, Los Angeles, CA (US); Hendrik John, Hunxe (DE)

(73) Assignee: Envisiontec GmbH, Gladbeck (DE)

( * ) Notice: Subject to any disclaimer, the term of this patent is extended or adjusted under 35 U.S.C. 154(b) by 45 days.

(21) Appl. No.: 12/916,818

(22) Filed: Nov. 1, 2010

(65) Prior Publication Data
US 2011/0062633 A1    Mar. 17, 2011

Related U.S. Application Data

(63) Continuation of application No. 11/123,973, filed on May 6, 2005, now Pat. No. 7,845,930.

(30) Foreign Application Priority Data

May 7, 2004   (DE) .................. 10 2004 022 606

(51) Int. Cl.
*B29C 35/08*    (2006.01)
(52) U.S. Cl. ...... 264/497; 264/401; 264/494; 425/174.4
(58) Field of Classification Search .................. 264/401, 264/497, 494; 425/174.4
See application file for complete search history.

(56) References Cited

U.S. PATENT DOCUMENTS

| | | | |
|---|---|---|---|
| 4,837,379 A | 6/1989 | Weinberg | |
| 4,929,402 A | 5/1990 | Hull | |
| 4,999,143 A | 3/1991 | Hull et al. | |
| 5,093,130 A | 3/1992 | Fuji et al. | |
| 5,137,662 A | 8/1992 | Hull et al. | |
| 5,139,338 A | 8/1992 | Pomerant et al. | |
| 5,143,663 A | 9/1992 | Leyden et al. | |
| 5,143,817 A * | 9/1992 | Lawton et al. ................. | 264/401 |

(Continued)

FOREIGN PATENT DOCUMENTS

| | | |
|---|---|---|
| DE | 4105314 | 8/1991 |
| DE | 4102257 | 7/1992 |

(Continued)

OTHER PUBLICATIONS

Burns "Automatic Fabrication Improving Productivity in Manufacturing," 1993 (ISBN 0-13-119462).

(Continued)

*Primary Examiner* — Joseph S Del Sole
*Assistant Examiner* — David N Brown, II
(74) *Attorney, Agent, or Firm* — Hansen IP Law PLLC

(57) ABSTRACT

The invention relates to a process or a device for the production of a three-dimensional object by layer-wise solidification of a photo-polymerizable resin by means of a planar or essentially planar construction/reference plane, at which the photo-polymerizable resin contained in the liquid material is to be hardened by electromagnetic irradiation, and wherein the material application for the subsequent layer automatically results from the separation of the last hardened layer from the construction/-reference plane, whereby the construction/reference plane is formed by an elastic film. The film is fixed in a frame, and the height position of the frame with the film is adjusted in a basin containing the liquid material such that the pressure of the liquid material compensates the sagging of the film (formation of a negative meniscus), and that the lower side of the film is permanently in contact with the material during the whole construction process.

20 Claims, 8 Drawing Sheets

U.S. PATENT DOCUMENTS

| | | | |
|---|---|---|---|
| 5,157,423 | A | 10/1992 | Zur |
| 5,158,858 | A * | 10/1992 | Lawton et al. ............... 264/401 |
| 5,171,490 | A | 12/1992 | Fudim |
| 5,173,266 | A | 12/1992 | Kenney |
| 5,174,931 | A | 12/1992 | Almquist et al. |
| 5,236,637 | A | 8/1993 | Hull |
| 5,247,180 | A | 9/1993 | Mitcham et al. |
| 5,248,456 | A | 9/1993 | Evans, Jr. et al. |
| 5,263,130 | A | 11/1993 | Pomerantz et al. |
| 5,268,994 | A | 12/1993 | Keskes |
| 5,289,214 | A | 2/1994 | Zur |
| 5,298,208 | A | 3/1994 | Sibley et al. |
| 5,306,446 | A | 4/1994 | Howe |
| 5,345,391 | A | 9/1994 | Hull et al. |
| 5,360,981 | A | 11/1994 | Owen et al. |
| 5,391,072 | A | 2/1995 | Lawton et al. |
| 5,447,822 | A * | 9/1995 | Hull et al. .................... 430/269 |
| 5,510,077 | A | 4/1996 | Dinh et al. |
| 5,529,473 | A | 6/1996 | Lawton et al. |
| 5,545,367 | A | 8/1996 | Bae et al. |
| 5,569,431 | A | 10/1996 | Hull |
| 5,571,471 | A | 11/1996 | Hull |
| 5,611,880 | A | 3/1997 | Onishi |
| 5,630,981 | A | 5/1997 | Hull |
| 5,651,934 | A | 7/1997 | Almquist et al. |
| 5,653,925 | A | 8/1997 | Batchelder |
| 5,823,778 | A | 10/1998 | Schmitt et al. |
| 5,858,746 | A | 1/1999 | Hubbell et al. |
| 5,891,382 | A | 4/1999 | Almquist et al. |
| 5,894,036 | A | 4/1999 | Tylko |
| 5,902,537 | A | 5/1999 | Almquist et al. |
| 5,945,058 | A | 8/1999 | Mannres et al. |
| 5,980,813 | A | 11/1999 | Narang et al. |
| 6,013,099 | A | 1/2000 | Dinh et al. |
| 6,027,324 | A | 2/2000 | Hull |
| 6,048,487 | A | 4/2000 | Almquist et al. |
| 6,051,179 | A | 4/2000 | Hagenau |
| 6,153,034 | A | 11/2000 | Lipsker |
| 6,158,946 | A | 12/2000 | Miyashita |
| 6,171,610 | B1 | 1/2001 | Vacanti et al. |
| 6,280,727 | B1 | 8/2001 | Prior et al. |
| 6,281,903 | B1 | 8/2001 | Martin et al. |
| 6,334,865 | B1 | 1/2002 | Redmond et al. |
| 6,352,710 | B2 | 3/2002 | Sawhney et al. |
| 6,500,378 | B1 | 12/2002 | Smith |
| 6,547,552 | B1 | 4/2003 | Fudim |
| 6,630,009 | B2 | 10/2003 | Moussa et al. |
| 6,764,636 | B1 | 7/2004 | Atlantic et al. |
| 6,833,231 | B2 | 12/2004 | Moussa et al. |
| 6,833,234 | B1 | 12/2004 | Bloomstein et al. |
| 6,942,830 | B2 | 9/2005 | Mulhaupt et al. |
| 6,974,656 | B2 | 12/2005 | Hinczewski |
| 6,989,225 | B2 | 1/2006 | Steinman |
| 7,073,883 | B2 | 7/2006 | Billow |
| 7,133,041 | B2 | 11/2006 | Kaufman et al. |
| 7,195,472 | B2 | 3/2007 | John |
| 7,215,430 | B2 | 5/2007 | Kacyra et al. |
| 7,261,542 | B2 | 8/2007 | Hickerson et al. |
| 7,467,939 | B2 | 12/2008 | Sperry et al. |
| 2001/0028495 | A1 | 10/2001 | Quate et al. |
| 2001/0048183 | A1 | 12/2001 | Fujita |
| 2002/0028854 | A1 | 3/2002 | Atlantic et al. |
| 2002/0155189 | A1 | 10/2002 | John |
| 2003/0067539 | A1 | 4/2003 | Doerfel et al. |
| 2003/0074096 | A1 | 4/2003 | Das et al. |
| 2003/0205849 | A1 | 11/2003 | Farnworth |
| 2004/0008309 | A1 | 1/2004 | Yamahara et al. |
| 2004/0020614 | A1 | 2/2004 | Lindsay et al. |
| 2005/0023710 | A1 | 2/2005 | Bridkin et al. |
| 2005/0208168 | A1 | 9/2005 | Hickerson et al. |
| 2005/0248061 | A1 | 11/2005 | Shkolnik et al. |
| 2005/0248062 | A1 | 11/2005 | Shkolnik et al. |
| 2005/0288813 | A1 | 12/2005 | Yang et al. |
| 2006/0078638 | A1 | 4/2006 | Holmboe et al. |
| 2006/0192312 | A1 | 8/2006 | Wahlstrom |
| 2006/0239588 | A1 | 10/2006 | Hull et al. |
| 2006/0249884 | A1 | 11/2006 | Partanen et al. |
| 2007/0074659 | A1 | 4/2007 | Wahlstrom |
| 2007/0075458 | A1 | 4/2007 | Wahlstrom et al. |
| 2007/0075459 | A1 | 4/2007 | Reynolds et al. |
| 2007/0075460 | A1 | 4/2007 | Wahlstrom et al. |
| 2007/0075461 | A1 | 4/2007 | Hunter et al. |
| 2007/0077323 | A1 | 4/2007 | Stonesmith et al. |
| 2007/0120842 | A1 | 5/2007 | Hess |
| 2007/0257055 | A1 | 11/2007 | Scott et al. |
| 2007/0259066 | A1 | 11/2007 | Sperry et al. |
| 2008/0038396 | A1 | 2/2008 | John et al. |
| 2008/0054531 | A1 | 3/2008 | Kerekes et al. |
| 2008/0169586 | A1 | 7/2008 | Hull et al. |
| 2008/0169589 | A1 | 7/2008 | Sperry et al. |
| 2008/0170112 | A1 | 7/2008 | Hull et al. |
| 2008/0179786 | A1 | 7/2008 | Sperry et al. |
| 2008/0179787 | A1 | 7/2008 | Sperry et al. |
| 2008/0181977 | A1 | 7/2008 | Sperry et al. |
| 2008/0206383 | A1 | 8/2008 | Hull et al. |
| 2008/0217818 | A1 | 9/2008 | Holmboe et al. |
| 2008/0226346 | A1 | 9/2008 | Hull et al. |
| 2008/0231731 | A1 | 9/2008 | Hull |
| 2008/0309665 | A1 | 12/2008 | Gregory, II |

FOREIGN PATENT DOCUMENTS

| | | |
|---|---|---|
| DE | 4125534 | 2/1993 |
| DE | 9319405 | 5/1994 |
| DE | 4340108 | 9/1997 |
| DE | 19727554 | 1/1999 |
| DE | 29911122 | 11/1999 |
| DE | 19838797 | 2/2000 |
| DE | 19929199 | 1/2001 |
| DE | 10003374 | 8/2001 |
| DE | 10018987 | 10/2001 |
| DE | 20106887 | 10/2001 |
| DE | 69909136 | 5/2004 |
| EP | 0250121 | 12/1987 |
| EP | 0435564 | 7/1991 |
| EP | 0426363 | 8/1991 |
| EP | 0466422 | 1/1992 |
| EP | 0484086 | 5/1992 |
| EP | 1250995 | 10/2002 |
| EP | 1250997 | 10/2002 |
| EP | 1270185 | 1/2003 |
| EP | 1192041 | 3/2003 |
| EP | 1156922 | 6/2003 |
| EP | 1338846 | 8/2003 |
| EP | 1674243 | 6/2006 |
| EP | 1849587 | 10/2007 |
| EP | 1880830 | 1/2008 |
| EP | 1894704 | 3/2008 |
| EP | 1950032 | 7/2008 |
| EP | 2011631 | 1/2009 |
| FR | 2254194 | 4/1974 |
| FR | 2583334 | 12/1986 |
| FR | 2634686 | 2/1990 |
| FR | 2696053 | 12/1993 |
| JP | 04371829 | 12/1992 |
| JP | 08192469 | 7/1996 |
| WO | 9511007 | 4/1995 |
| WO | 9600422 | 1/1996 |
| WO | 0100390 | 1/2001 |
| WO | 0112679 | 2/2001 |
| WO | 0172501 | 10/2001 |
| WO | 03059184 | 7/2003 |
| WO | 2005110722 | 11/2005 |

OTHER PUBLICATIONS

Wohlers Report 2000, "Rapid Prototyping & Tooling State of the Industry Annual Worldwide Progress report," T. Wohlers, Wohlers Association, Inc., Fort Collins, Colorado (2000).

Stark, G.B., et al.,"Biological Matrices and Tissue Reconstruction," Springer Publications, Berlin (1998).

Sachs. E., et al., "Three Dimensional Printing: Rapid Tooling and Prototypes Directly from CAD Model," Journal of Engineering for Industry, 114:4810-488 (1992).

Kuhtreiber, W., Ph.D., et al., "Cell Encapsulation Technology and Therapeutics," Birkhauser, Boston (1998).

Landers, R., and Mulhaupt, R., "Desktop Manufacturing of Complex Objects, Prototypes and Biomedical Scaffolds by Means of Computer-Assisted Design Combined with Computer-Guided 3D Plotting of Polymers and Reactive Oligomers," Macromolecular Materials and Engineering, 282:17-22 (2000).

Okada, T., and Ikada, Y., "Tissue Reactions to Subcutaneously Implanted, Surface-Modified Silicones," Journal of Biomedical Materials Research, 27:1509-1518 (1993).

*Complaint, 3D Systems* v. *Envisiontec Incorporated et al.*, Case 2:05-cv-74894-AC-RSW.

Nikolaychik, V.V., et al., A New, Cryoprecipitate Based Coating for Improved Endothelial cell Attachment and Growth on Medical Grade Artificial Surfaces; ASAIO Journal, 40:M846-M852 (1994).

Relou, I.A., et al., "Effect of Culture Conditions on Endothelial Cell growth and Responsiveness," Tissue & Cell, 30 (5) :525-538 (1998).

* cited by examiner b)

c)

PROCESS FOR THE PRODUCTION OF A THREE-DIMENSIONAL OBJECT WITH AN IMPROVED SEPARATION OF HARDENED MATERIAL LAYERS FROM A CONSTRUCTION PLANE

CROSS-REFERENCE TO RELATED APPLICATIONS

This application is a continuation of U.S. patent application Ser. No. 11/123,973, filed May 6, 2005, the entirety of which is hereby incorporated by reference.

TECHNICAL FIELD

The invention relates to a process and a device for the production of a three-dimensional object by layer-wise solidification of a photo-polymerizable resin by means of a planar or essentially planar construction/reference plane, at which the photo-polymerizable resin contained in a liquid material shall be hardened layer-wise by electromagnetic irradiation, whereby the construction/reference plane is formed by an elastic film.

BACKGROUND ART

For the layer-wise construction of three-dimensional objects from photo- and particularly light-hardening polymers or resins, various processes are mentioned in the literature, see "Automated Fabrication—Improving Productivity in Manufacturing" by Marshall Burns, 1993 (ISBN 0-13-119462-3).

Three variants fall under the described processes, where the layer to be generated is selectively illuminated through a transparent reference plane, a so-called "contact window" 12 (contact window), and polymerized/hardened at this plane. The three variants are sketched in FIGS. 8A-C.

In order to separate the hardened material layer from the contact window/the reference plane, a solution is described in the patent documents U.S. Pat. No. 5,171,490 (Efrem V. Fudim) and DE 41 25 534 A1 (EOS GmbH, Electro Optical Systems) for the separation by means of a thin film of flexible resin/polymer.

The EP 0 484 086 A1 describes the application, in the construction/reference plane, of a separation film which is in a semi-permeable form, in order to be permeable in one direction towards a deformable coating mixture, but to be impermeable in the opposite direction towards the photopolymerizable resin. By the permeation of the deformable coating mixture, the adhesive forces of the film towards the hardened layer shall be reduced. The deformable coating mixture may be a gas, a liquid or a gel, i.e. a fluid. The film is fixed in a frame. A frame translation device executes a translation movement after the photohardening of each layer, respectively. Due to the fixation in the frame and the additional provision of the deformable coating mixture, the stress on the semi-permeable film is high.

In EP 0 435 564 and, in another form, in EP 0 466 422 a transparent plate is required for the separation process, whereby a film, which is fixed above the plate, is subjected to tension.

DRAWBACKS OF BACKGROUND ART

When selectively illuminating by laser or mask in differently formed area structures directly at a face of a transparent reference plane that is opposite to the irradiation source, the resin polymerizes in direct contact with this reference plane. The problem resides in separating the layer, which has a differently formed area structure, from the transparent reference plane such that it maintains adhered to the previously generated layers and that, by means of the separation force, neither the formed layer nor the already generated part of the object is deformed or even destroyed or torn apart, and that finally the object that is generated layer by layer keeps adhered to the support plate over the whole construction process.

When using a separation film, the so-called peeling effect is utilized, that is the film in a way just peels off from the hardened polymer layer by means of the separation process, whereby separation forces in Z-direction are decreased based on a vectorial resolution of forces.

When the film serves as a separation layer for a transparent reference plane, e.g. a glass or plastic plate, Newton rings or bubble inclusions that may negatively affect and falsify the optical image of the mask in the construction plane may arise at the partial contact of the film with the plate.

In most cases of the above-mentioned patents, for the purpose of separating the hardened layer and for the purpose of applying fresh material, the film is moved, pulled off or rolled off. This puts a strain to the film at an increased level and, thus, reduces the lifetime. Besides, additional mechanically driven components of deformable coating fluids are to be used, which tends to produce defects.

If the film is used without a bulk reference plate as a setting face, the film sags in any case, even at high tension in advance, whereby a planar construction plane is not ensured any more. This effect is exaggerated, if a deformable coating fluid is combined with a semi-permeable film. If an essentially planar configuration of the film, without support by a bulk reference plate, is selected and for example additionally loaded with coating fluids, the film is readily overstressed and the lifetime is further reduced, in particular when thin films are used.

DESCRIPTION OF ADVANTAGES OF EMBODIMENTS

By means of preferred embodiments herein, the disadvantages of the prior art are eliminated, and the following described advantages can be achieved.
  a) No or minimal disturbances towards the optical image occur, i.e. the number of optical transitions from one to another medium (having different densities) is reduced.
  b) The separation forces to the lastly hardened layer and thereby to the model are minimized.
  c) Neither additional means nor additional process have to be used for applying a fresh layer of material.
  d) The separation process is not limited by the size of the hardened area.
  e) It is possible to carry out hardening at a planar or approximately planar construction/reference plane without using a bulk reference plate.
  f) The use of mechanically driven components can be reduced to a minimum.

The separation layer in the form of a film at the same time serves as a planar or approximately planar reference/construction plane. As material for the separation layer, an elastic, transparent/translucent material such as e.g. silicon or other resin types are used. Preferably, the film is neither permeable nor semi-permeable, and/or the film is not coated with a deformable coating fluid.

The film is held in a frame and in advance is subjected to an adjustable tension, which is necessary for fixing the film. In a way the film frame floats on the photopolymer and thus is in permanent contact with the photopolymer. Also during the construction process, the lower face of the film is permanently in contact with the material containing the photopolymer, independent from the state of the material containing the photopolymer. Also and in particular during the separation process the contact is maintained, so that fresh liquid material can flow in from the side. Since the film is subjected to essentially no, or only to a low advance tension, a plastic deformation or creeping of the film material is not expected, which again is in favor of a high lifetime of the film. A sagging of the film, which results from the essentially absent advance tension, or from only a low advance tension, is compensated by pressure appearing in the liquid bath. The above mentioned advantages of the invention can be realized in a particular effective manner by a combinatory adjustment of conditions with respect to (i) advance tension of the film which is fixed within the frame, and (ii) height level of the frame and thus of the film in the liquid bath, in particular in a manner that the film is subjected to essentially no, or only to a low advance tension and, at the same time, pressure in the liquid bath provides for a compensation of a sagging of the film, that is the formation of a negative meniscus is avoided, without a further support, e.g. by means of a plate, being necessary. It is even an advantage, if the construction/reference plane is formed by the film alone, without support by an optionally transparent glass or plastic plate.

Since a reference plane in the form of an additional transparent glass or plastic plate can be omitted according to the present invention, optical defects by Newton rings or entrapped air bubbles, which would be generated when contacting the film with the reference plane, can be eliminated.

The film frame is positioned within the photopolymer basin and is adjusted or set to sink in its level in such a manner that the "sagging" of the film (negative meniscus), in the state of rest, is compensated by the pressure of the liquid material containing the photo-polymerizable resin towards the film. The pressure might be formed mainly by the pressure of the liquid or the hydrostatic pressure.

The film may be elastically deformed during the separation process, so that a so-called "peeling off" or "pulling off" process is caused at the hardened layer. By means of the elastic deformation of the separation layer, or by the pulling off process, a displacement/vector resolution of the separation force vector takes place, which substantially facilitates the separation process.

The material of the film may be selected or optimized for the separation process, depending on the used photopolymer.

An additional "anti-adhesion" effect and a slight inhibition of the radical polymerization by acrylate systems may be achieved e.g. by the use of FEP-, PTFE- or PFA-films.

The film may be replaced without problems when damaged or worn out.

BRIEF DESCRIPTION OF THE DRAWINGS

The present invention will be explained in the following by way of examples and without limitations by means of drawings. In the drawings.

DETAILED DESCRIPTION

Figure 1:
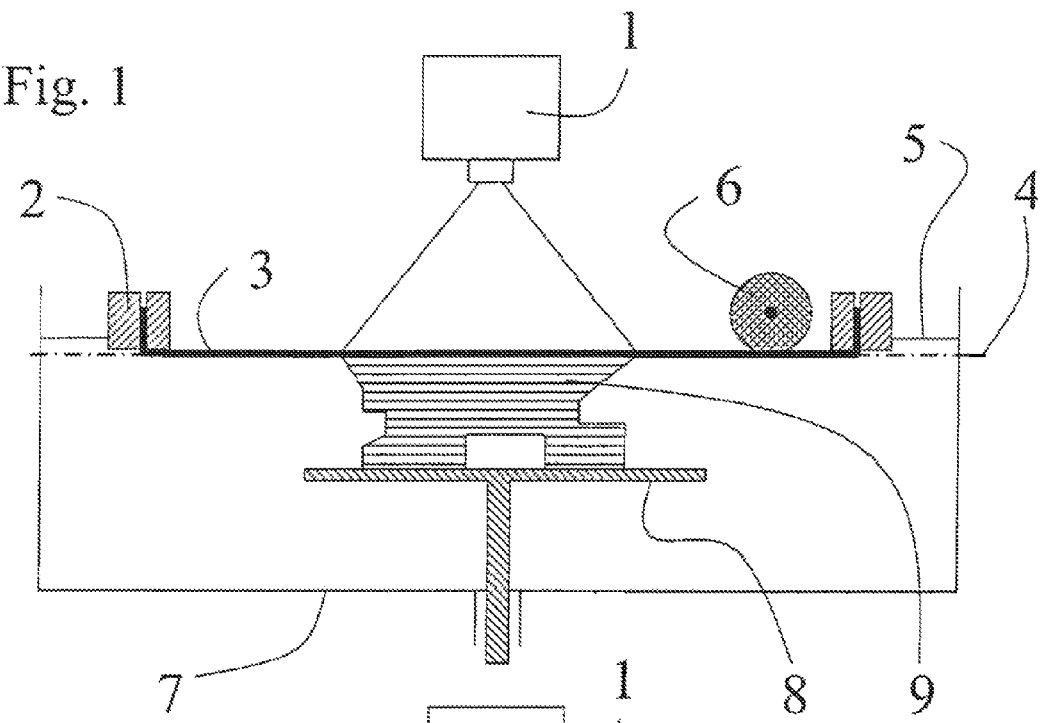
FIG. 1 is a schematic basic constitution of a process or a device (sectional view) according to a preferred embodiment of the present invention.

The constitution in FIG. 1 schematically shows in a sectional view an embodiment of the device of the invention for the rapid prototyping process based on a photo-solidification by means of laser or mask illumination with the assistance of the projection unit 1, wherein, below the projection unit, a liquid material having a surface level 5, containing a photopolymer (photo-polymerizable resin), is present in a basin 7. The liquid, or at least flowable, material may be formed by the liquid photopolymer itself, or by a mixture or solution of the photopolymer with a carrier material. In the basin and thus within the liquid material, a carrier plate 8 is present, which can be moved in vertical direction. At the level of the surface of the material, a frame 2 is disposed, in which a film 3 is clamped in. The film 3 is fixed or inserted in the frame at a necessary advance tension, and the frame is to be positioned in its height, or is sinkable into the material such that the pressure of the liquid material compensates the "sagging" of the film, whereby an approximately planar construction plane is created. Thus, with this described device, it is possible to abolish a transparent reference plane in the form of a transparent glass or plastic plate for ensuring a planar construction plane 4 (setting face for the film). The film thus is in permanent contact with the photopolymer—independent from the state of the photopolymer (being either liquid, in the process of hardening, or hardened).

For the first layer, the support plate 8 is moved below the surface of the material to such an extent that the depth hardening of the selectively illuminated photopolymer by the exposure unit ensures a firm adhesion of the first layer to the upper face of the support plate. Here, light energy is brought directly from above through the film into the photopolymer. The illumination may be carried out selectively via laser or via mask illumination by means of a projection unit, e.g. on the basis of DLP®/DMD®.

Figure 2:
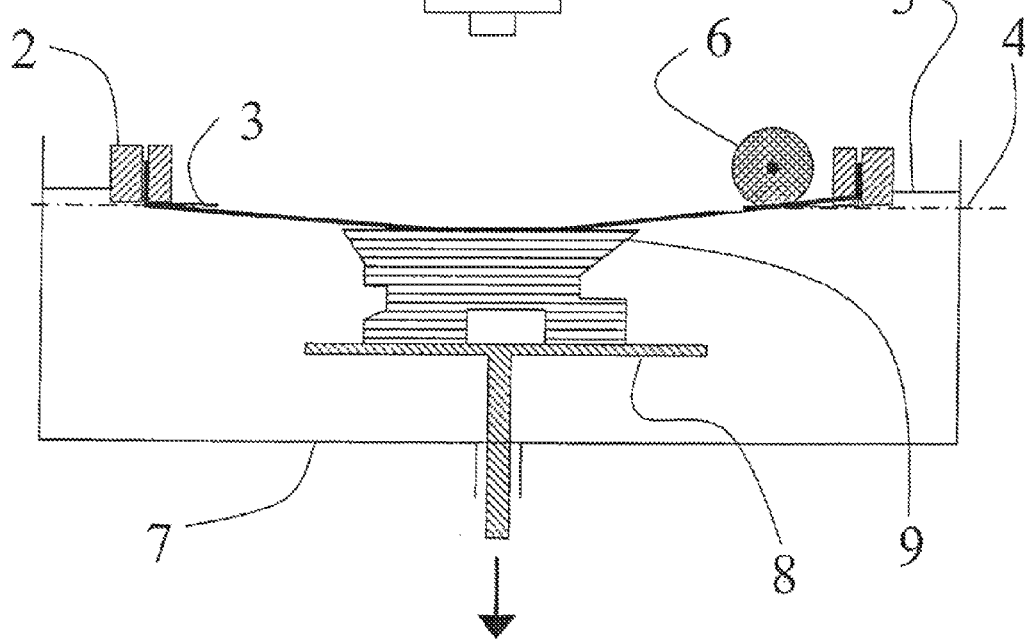
FIG. 2 to FIG. 6 are schematically different steps in the course of the process for the production of a three-dimensional object according to a preferred embodiment of the present invention.
Figure 7:
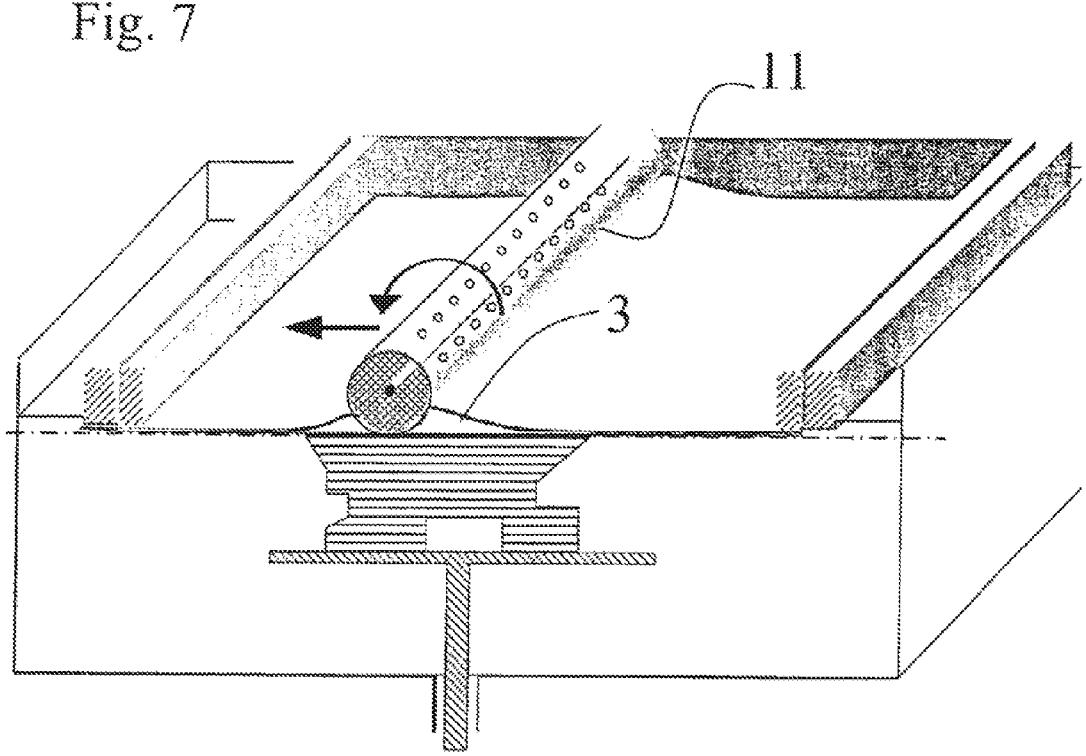
FIG. 7 is schematically in perspective view a preferred type of separating the film from the lastly hardened polymer layer.
Figure 8:
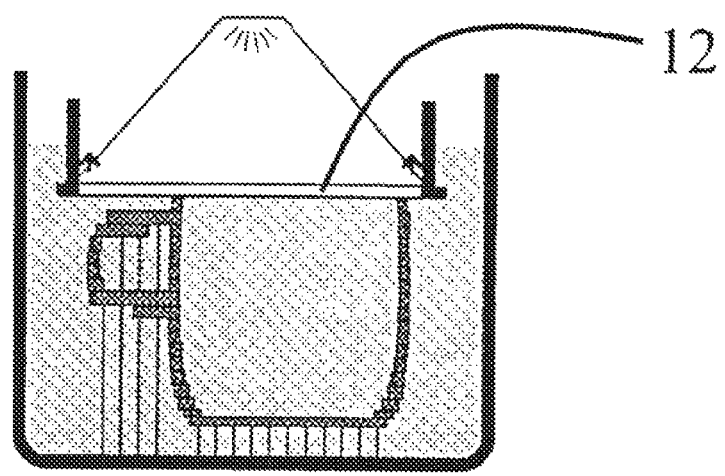
FIG. 8 schematically are three variants of a conventional production of a three-dimensional object.
Figure 8:
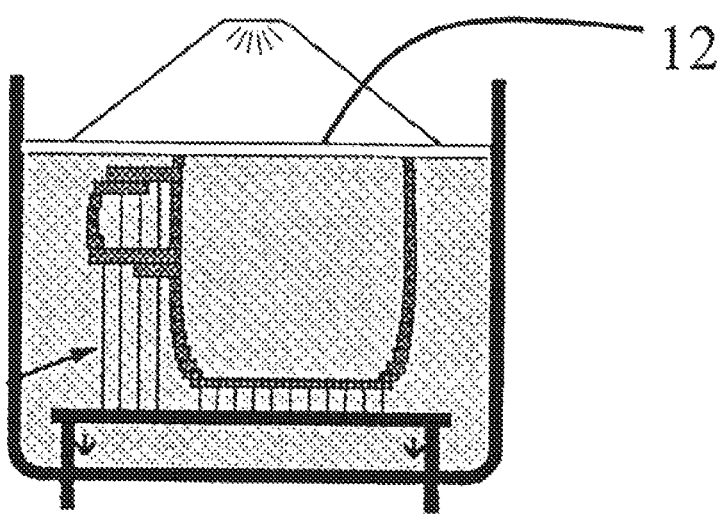
Figure 8:
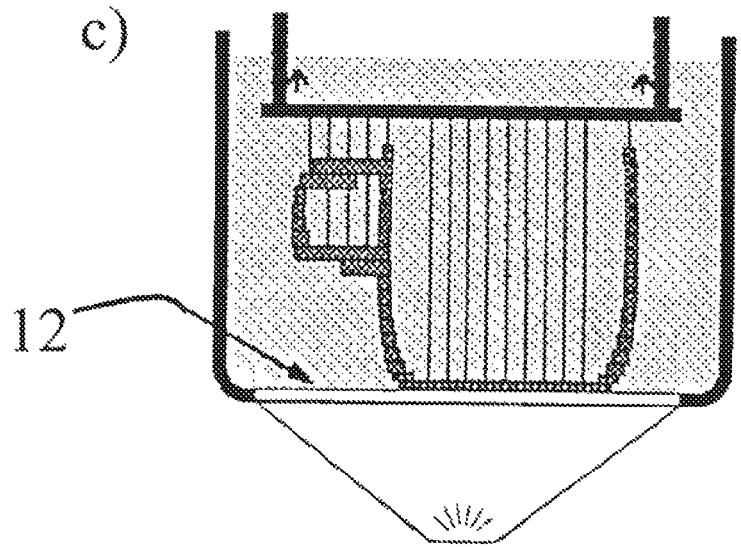

After hardening the layer due to the irradiation of electromagnetic irradiation through the film, the layer adheres both to the support plate as well as to the lower side of the film. As shown in FIG. 2 by means of a separation of an object that already comprises several layers, the lowermost hardened layer keeps adhered to the support plate when sinking the support plate. By means of a peel off process, the film separates from the last hardened layer. The complete separation of the film from the hardened layer may be assisted alternatively by the following means or measures a) to c):

a) The support plate, together with the hardened layer, may be moved away from the construction plane at an extent exceeding the level of the subsequent layer to be hardened. Here the position of the frame with the film is not changed. After complete separation of the hardened layer from the film, the support plate with the hardened layer can be moved back to the level of the subsequent layer to be hardened (between construction plane 5 and the last hardened layer 9).

b) The frame with the film may be moved translatorily and/or rotatorily within or out of the construction plane, away from the hardened layer, and, after the support plate with the hardened layer is moved away from the construction plane by the level of the next layer to be hardened, it is again brought into the original position.

c) An element generating a partial vacuum, which is for example designed in the form of a puller, a slider or a roll, and which is provided with at least one suction opening at least at the lower side that is directed towards the film, is brought in contact with the upper side of the film. This may be accomplished, for example, by a "vacuum roll" shown schematically in FIG. 7, which is provided with suction openings over its circumference and is communicated, via a conduit, with a suction means for generating a partial vacuum. The roll is rolled over the upper side of the film, while a partial vacuum is applied, and thereby the film is raised up along the roll or pulled off the hardened material layer. This process has the advantage that the support plate with the layers already generated must be moved downwards only by the level of the next layer thickness. A slider, a puller or a plate can be used for removing the convex curving of the film (positive meniscus) instead of a roller. The respective means for planarizing may be moved, for the process of planarization, from a position outside the illuminated working area into the illuminated working area at a time suitable for planarization. Alternatively the respective means can be located within the illuminated working area all the time and be contacted with the film in the step of planarization, wherein in this case the means for planarization should be made transparent or translucent.

Figure 3:
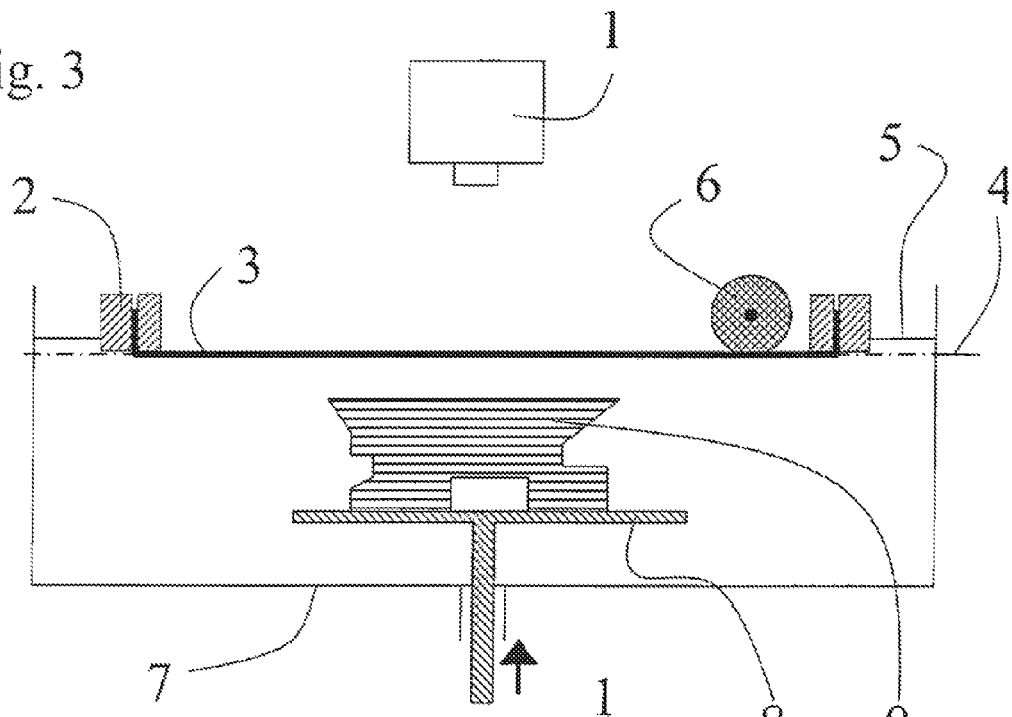

Since there is still contact of the film with the liquid material containing the photopolymer sidewards of the hardened material, fresh, liquid material automatically flows during the separation process of the film and the hardened layer in the gap between the last hardened layer and the film (see FIG. 3).

Figure 4:
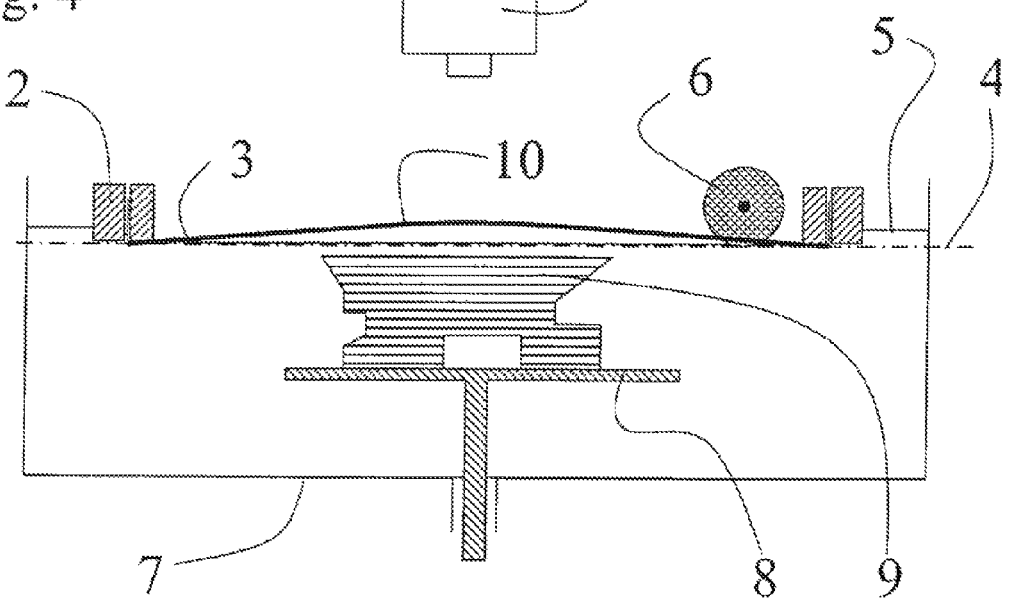
Figure 5:
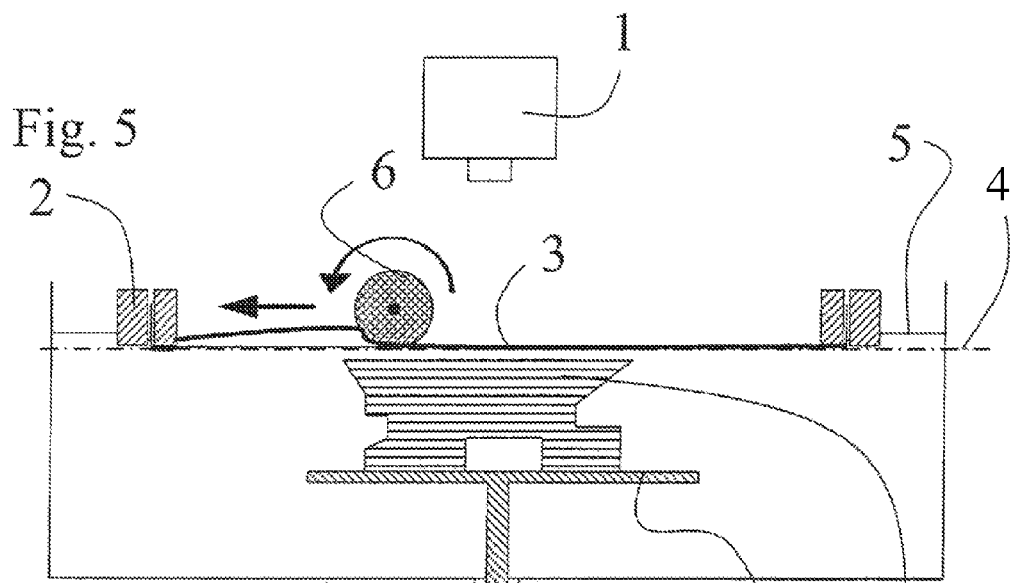

By the separation processes and the repositioning of the different components, such as the construction platform, the film frame or the film, for the subsequent hardening process of the next layer, the film may be curved up (convex) by the enclosed photopolymer, as shown in FIG. 4. In order to eliminate the thus formed positive meniscus and to ensure again an approximately planar construction plane, the excessive material will be pushed away from the gap between the last hardened layer and the film by means of a roll which is moved along the upper side of the film (see FIG. 5). In case that a "vacuum roll" shown in FIG. 7, which previously assisted the separation of the film and the hardened layer, is used in the device, the partial vacuum may be switched off in this step of pushing aside excessive materials according to FIG. 5.

Figure 6:
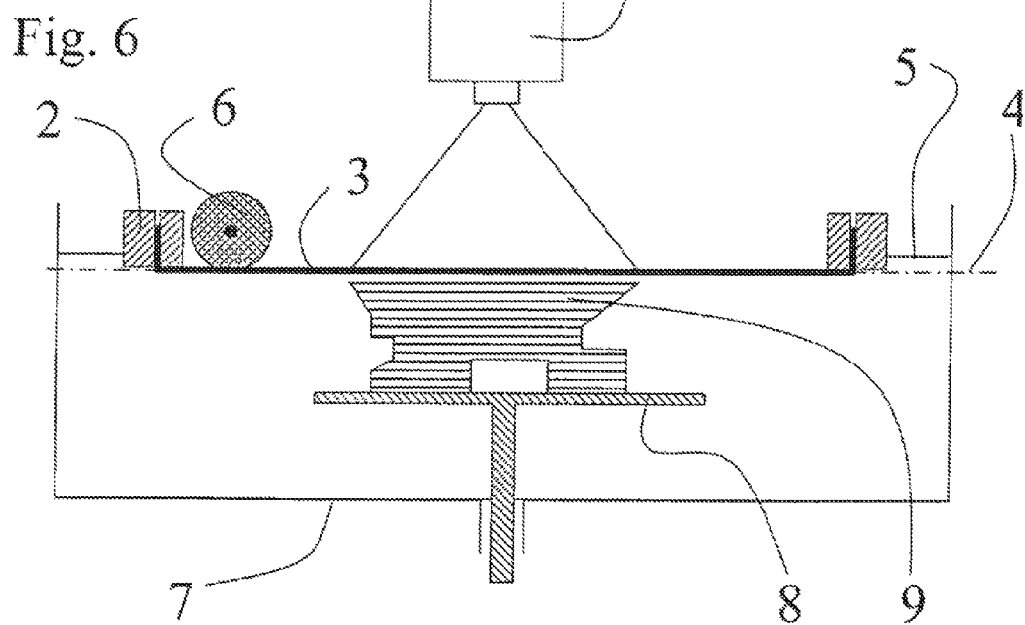

As the material application now automatically results from the adjustment of an appropriate gap between film and last hardened layer after the described separation, the next layer is hardened subsequently and the separation process repeated in the following (see FIG. 6). The whole process is repeated as long as the three-dimensional object is constructed as a whole layer by layer.

An alternative and advantageous embodiment according to another aspect of the present invention, where the construction/reference plane is made flat again after hardening the preceding layer, is shown in FIGS. 9 to 15. This embodiment can be carried out instead of the embodiments shown in FIGS. 5 to 7. Same reference signs denote corresponding elements and means. The projection unit 1 is not shown in FIGS. 9 to 15.

Figure 9:
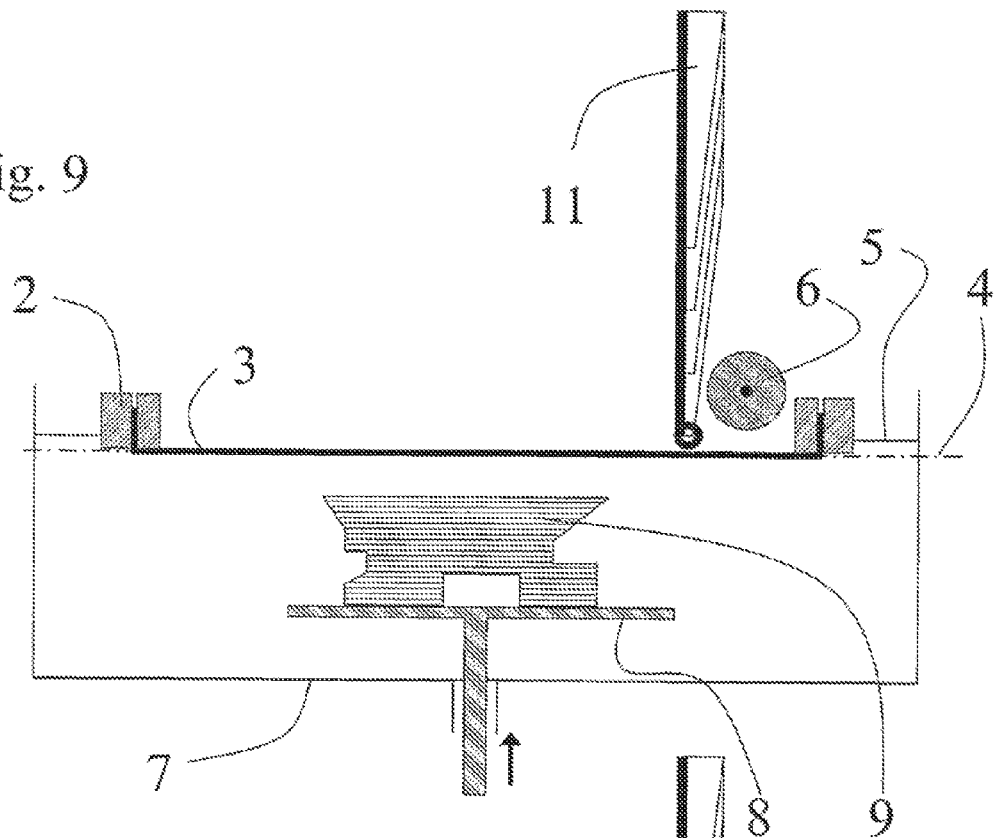
FIG. 9 is a schematic cross-sectional view of an apparatus for making a three-dimensional object using a segmented plate and shown in a first configuration.

FIG. 9 shows the initial status after separation from the preceding hardened layer of the object 9. The layer 3 is in an arbitrary or undefined position. A plate 11, which comprises several segments (see also FIG. 14, reference sign 11*a*, 1.-4. from the center to the outside), is in a state of rest, e.g. is tilted upwards.

Figure 10:
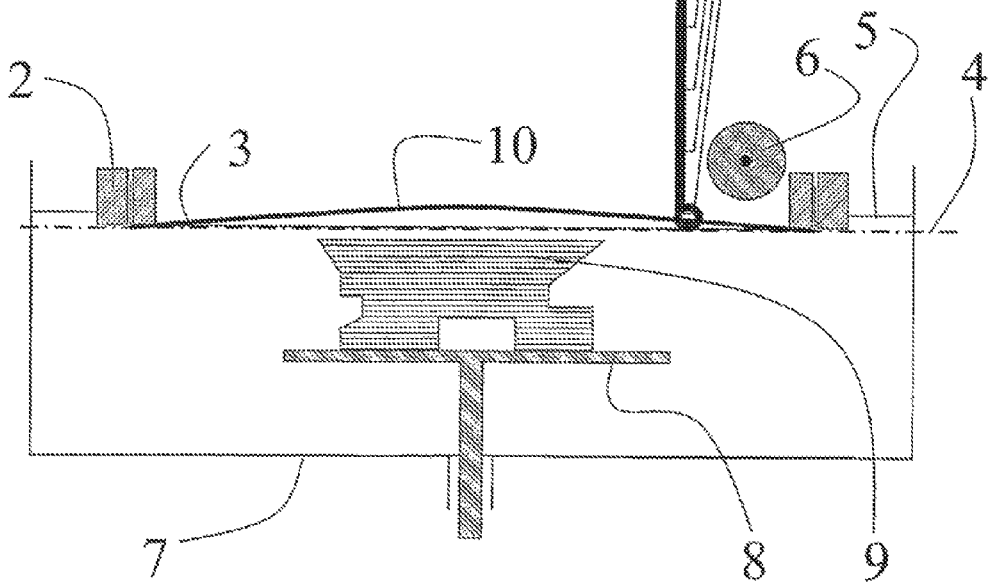
FIG. 10 is a depiction of the apparatus of FIG. 9 in a second configuration.
Figure 11:
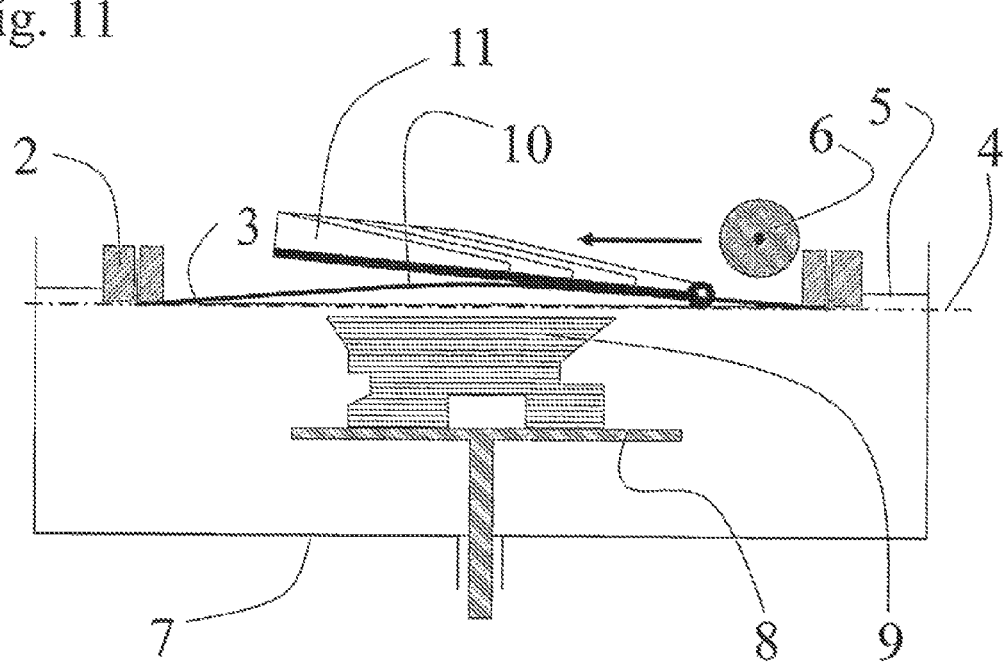
FIG. 11 is a depiction of the apparatus of FIG. 9 in a third configuration.
Figure 14:
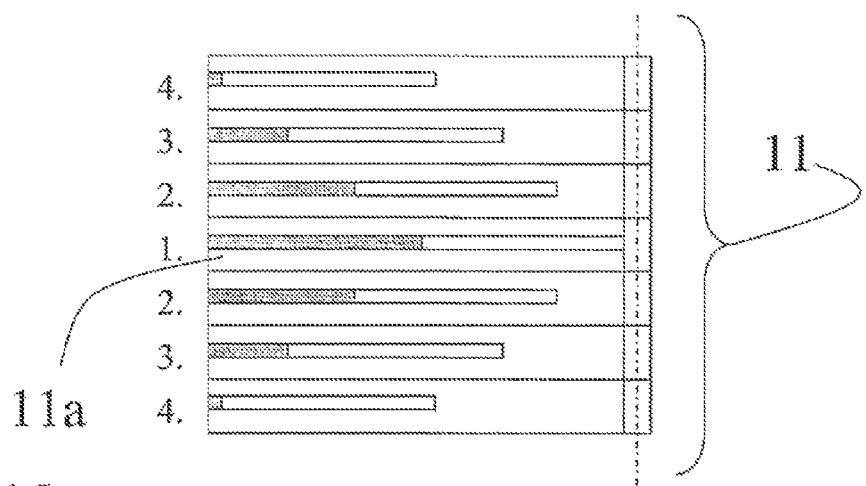
FIG. 14 is a top plan view of the segmented plate of FIG. 9.

On each segment, a rib or a rising protrusion (shown in FIG. 14 with a elongated rectangle on the upper face of the segment, where the maximal height of the rib or the protrusion is indicated with the dark color), which comes out or which starts to ascend at a different distance from the pivoting axis depending on the respective segment (right side in FIG. 14). As shown in FIG. 10, a convex curving 10 (positive meniscus) may be formed, by way of positioning (rising up) the object for the illumination of the next layer, by entrapped volumes of non-polymerized photo polymer such that a planar construction/reference plane is not ensured anymore.

Figure 12:
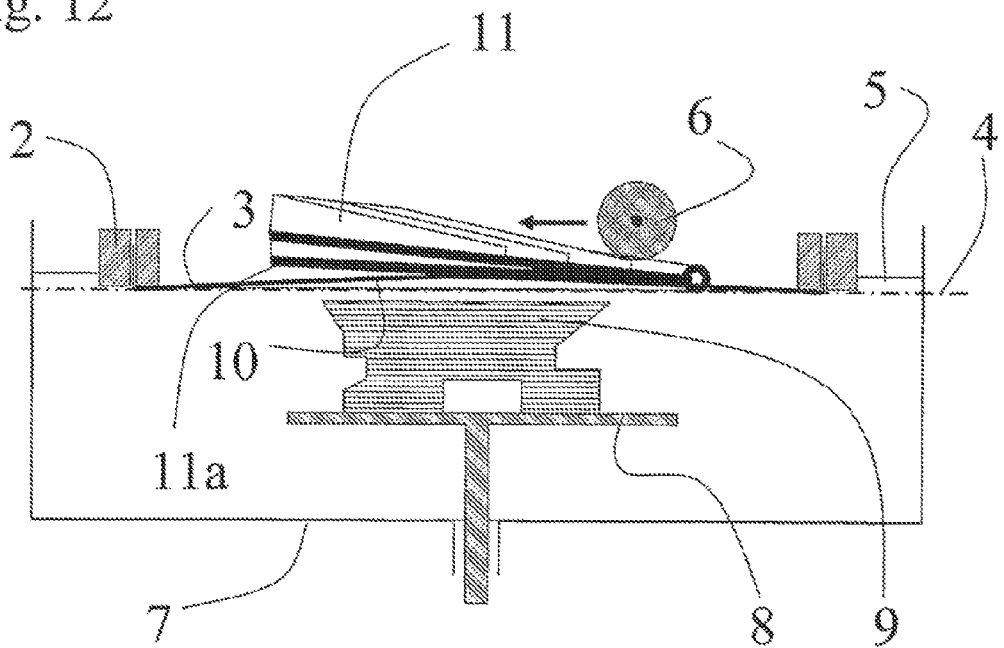
FIG. 12 is a depiction of the apparatus of FIG. 9 in a fourth configuration.

In order to suppress this positive meniscus and to form again a planar construction/reference plane, the segments 11,11*a*,1.-4. are tilted altogether downwards and lie on top of the convex curved film 10. Now, in order to press the segments onto the film, a pressure roller 6 is inserted in the direction from the pivoting axis. Due to the ribs or protrusions differently displaced per segment in the rolling direction (which is indicated by an arrow), the segments, partially certain segments concurrently, are pressed successively against the film, whereby the film is pressed back into the construction/reference plane and the excessive material is gradually removed. This process is most effective, if the distance of the rib or the protrusion to the pivoting axis is smallest at the central segment 11*a* (1.), and if this distance is increased to the outside (2.-4.), as shown in FIG. 12, such that the process of pressing and material removal by the pressing of the roller 6, starting with the central segment 11*a*, is conducted from center to the side. However, other forms of providing the ribs/the protrusions are possible, so that corresponding other orders of pressing may take place.

Figure 13:
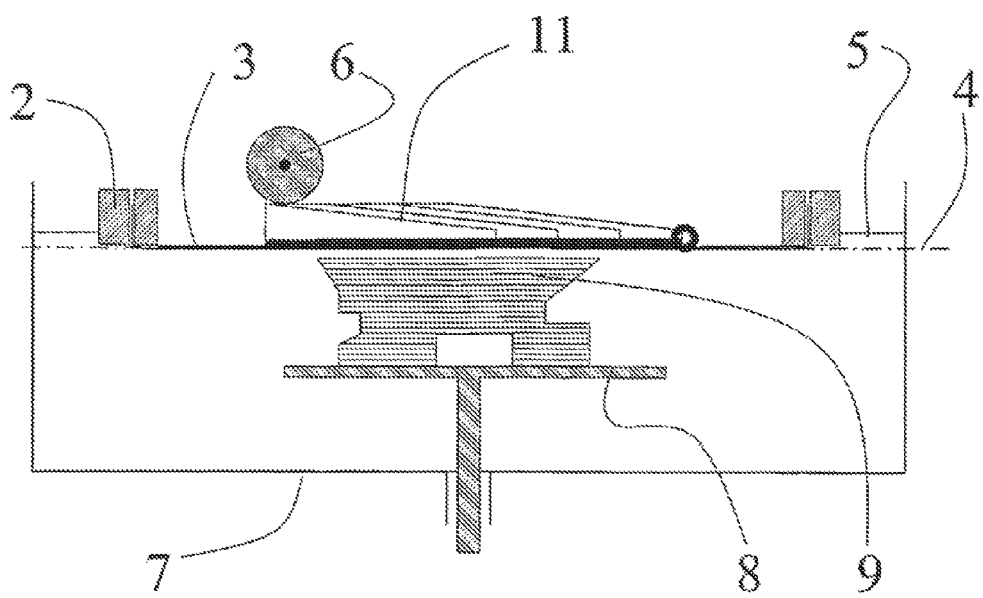
FIG. 13 is a depiction of the apparatus of FIG. 9 in a fifth configuration.

FIG. 13 shows the end position of the roller, in which all segments of the plate, and therefore the film, are placed in the construction/reference plane.

FIG. 14 shows, in a plane view, a possible embodiment of the segments having their ribs.

Figure 15:
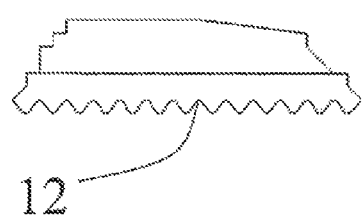
FIG. 15 is a depiction of a lower side of the segmented plate of FIG. 9.

In order to avoid an adhesion of the plate segments 11,11*a*, 1.-4. to the film 3 and to enable a easier separation of the segments 11,11*a*,1.-4. (that is also the tilting up of the segments into the position of rest) without changing the planarized position of the film, the lower side of the plate segments is preferably made rough or structured, as shown in FIG. 15 with the reference sign 12.

In FIG. 9-14 the ribs or protrusions are formed, in their longitudinal profile, evenly ascending or (as shown in FIG. 14 by the dark color) at an even height. However, they can be formed with interruptions or with waveforms or with other suitable form, in order to modify the pressing effect onto the film. Also, other suitable means or structured elements can be used instead of the plate shown in FIG. 9-14. For example, the single segments may not be separated in the longitudinal direction, but may be connected by elastic connections. Or the plate, which in the above embodiment is for example formed of plastic or metal, may be embodied as a flexible mat, made e.g. from rubber, which mat comprises in respective longitudinally oriented areas the ribs or protrusions. Protrusions on the mat may be placed apart in the longitudinal direction. In another embodiment an ascending V-like protrusion is formed instead of the elongated ribs, in order to achieve a removal of the non-polymerized photopolymer sidewards from the center.

The above description of the preferred embodiments was made only by way of example for explanation; rather, any variations and combinations of the described features and advantages are possible within the scope of the invention.

What is claimed is:

1. A process for making a three-dimensional object from a solidifiable material, comprising:
   providing a solidifiable material container;
   providing a film having two ends separated by a width;
   solidifying a portion of the solidifiable material in contact with the film to create a solidified object section;
   traversing a film separation member relative to the film and along the width of the film while maintaining the first film end at a fixed height relative to the container and maintaining the second film end at the fixed height relative to the container, thereby separating the solidified object section from the film; and
   supplying solidifiable material between the solidified object section and the film.

2. The process of claim 1, wherein the two ends of the film are attached to a frame, and the frame has a fixed position relative to the solidifiable material container during the process.

3. The process of claim 1, further comprising moving the solidified object section in a direction away from the two film ends prior to the traversing step.

4. The process of claim 1, further comprising providing an object carrier movably disposed within the container along the direction of the height of the two film ends relative to the container, wherein following the step of solidifying a portion of the solidifiable material in contact with the film, the object carrier is moved in a direction away from the two film ends.

5. The process of claim 1, wherein the container has an open top and a bottom, and the two ends of the film are located beneath the open top.

6. The process of claim 1, wherein the film separation member comprises one selected from a puller, a slider, and a roll.

7. A process for making a three-dimensional object from a solidifiable material, comprising:
   providing a solidifiable material container having a solidifiable material with an exposed surface;
   providing a film having a two ends separated by a width, wherein the two film ends are disposed beneath the exposed surface of the solidifiable material;
   solidifying a portion of the solidifiable material in contact with the film to create a solidified object section; and
   traversing a film separation member relative to the film and along the width of the film, thereby separating the solidified object section from the film.

8. The process of claim 7, wherein the two ends of the film are attached to a frame, and the frame has a fixed position relative to the solidifiable material container during the process.

9. The process of claim 7, wherein the two film ends have a same fixed height relative to the solidifiable material container.

10. The process of claim 7, further comprising supplying solidifiable material between the solidified object section and the film.

11. The process of claim 7, wherein the solidifiable material container has an open top and a bottom, and the film is located below the open top of the container.

12. The process of claim 7, further comprising moving the solidified object section in a direction away from the two film ends prior to the traversing step.

13. The process of claim 7, wherein the film separation member comprises one selected from a puller, a slider, and a roll.

14. A process for making a three-dimensional object from a solidifiable material in a solidifiable material container, comprising:
   contacting the solidifiable material with a film having a width;
   solidifying the solidifiable material in contact with the film, thereby creating a solidified object section; and
   traversing a film separation member relative to the film and along the width of the film, wherein during the traversing step the film remains in contact with either or both of the solidifiable material and a solidified object section.

15. The process of claim 14, wherein during the entire process of forming the three-dimensional object, the film remains in contact with either or both of the solidifiable material and a solidified object section.

16. The process of claim 14, wherein the film has two ends separated by the width, and the two ends have a same height relative to the solidifiable material container.

17. The process of claim 14, wherein the solidifiable material has an exposed surface, and the film is disposed beneath the exposed surface.

18. The process of claim 14, wherein the solidifiable material container has an open top and a bottom, and the film is located below the open top of the container.

19. The process of claim 14, wherein the step of solidifying the solidifiable material in contact with the film comprises supplying solidification energy to a working area in the solidifiable material container, and at least a portion of the film remains in the working area during the entire process of forming the three-dimensional object.

20. The process of claim 14, wherein the film separation member comprises one selected from a puller, a slider, and a roll.

* * * * *